Nov. 5, 1963 T. A. McCOY 3,109,914
WELDING UNIT FOR LAP-WELDING MACHINES
Filed Nov. 24, 1961 2 Sheets-Sheet 1

INVENTOR.
Thomas A. McCoy
BY
Webster & Webster
ATTYS.

Nov. 5, 1963 T. A. McCOY 3,109,914
WELDING UNIT FOR LAP-WELDING MACHINES
Filed Nov. 24, 1961 2 Sheets-Sheet 2
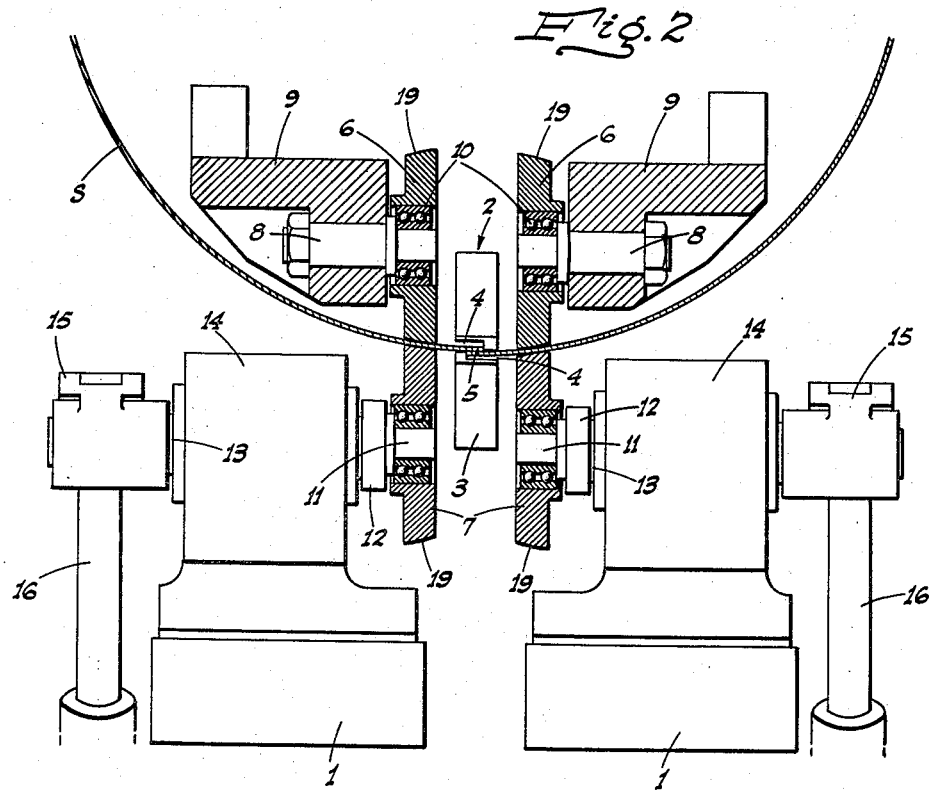
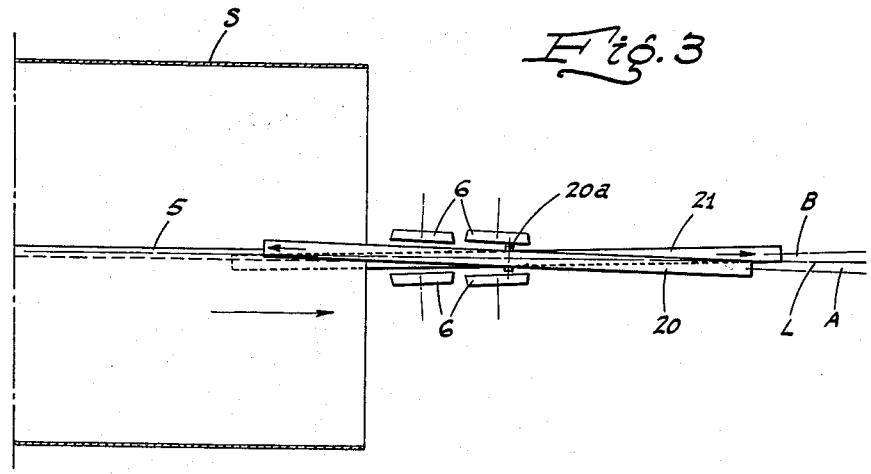

United States Patent Office 3,109,914
Patented Nov. 5, 1963

3,109,914
WELDING UNIT FOR LAP-WELDING MACHINES
Thomas A. McCoy, Stockton, Calif., assignor to Carando Machine Works, Stockton, Calif., a partnership
Filed Nov. 24, 1961, Ser. No. 154,684
4 Claims. (Cl. 219—64)

This invention relates to machines for welding the lapped edges of cylindrical shells, and particularly to the lap-maintaining and welding elements of such machines.

A machine of this type includes a Z-bar having outwardly facing grooves in its sides arranged to receive the initially separated edges of a shell, and to gradually cause such edges to be moved into close overlapping relation as they move beyond the exit end of the Z-bar. Crowder wheels engage the shell to maintain said edges in their lapping relation as they emerge from the Z-bar, and resistance or welding wheels then engage the lapped edges from above and below the same. Heretofore, such resistance wheels have been disposed in direct alinement with each other and with the longitudinal plane of the lapped edges. Due to the great pressure which must be exerted by the resistance wheels against the lapped edges, and to the high temperature generated by the welding action, the lapped edges, as they become flattened by the pressure and heat, tended to move apart or expand laterally. This caused the diameter of the welded shell to vary from the intended dimension, and could only be counteracted, if at all, by placing the adjacent crowder wheels under a pressure greater than they could practicably withstand for any length of time.

It is therefore the principal object of this invention to avoid or eliminate the objectionable feature above recited by arranging the resistance wheels relative to each other so that as such wheels flatten out and heat the lapped portions of the shell, they will at the same time move such portions laterally inward or toward each other to the extent necessary to maintain the lapped edges in their initial relation to each other.

In connection with the above arrangement of the resistance wheels, it is another object of the invention to dispose the foremost crowder wheels a sufficient distance back from the resistance wheels that the desired action of the crowder wheels does not interfere with the desired edge-shifting action of the resistance wheels, and vice versa, and the pressure action of the crowder wheels may be kept within practical and easily maintained limits without excessive wearing strains being placed thereon.

A further object of the invention is to provide a practical, reliable, and durable welding unit for lap-welding machines, and one which will be exceedingly effective for the purpose for which it is designed.

These objects are accomplished by means of such structure and relative arrangement of parts as will fully appear by a perusal of the following specification and claims.

In the drawings:

FIG. 2 is an enlarged fragmentary transverse section taken generally on line 2—2 of FIG. 1.

FIG. 3 is a diagrammatic plan view showing the relationship of the resistance wheels relative to each other and to the crowder wheels transversely of the machine, and relative to the shell lap being welded.

Figure 1:
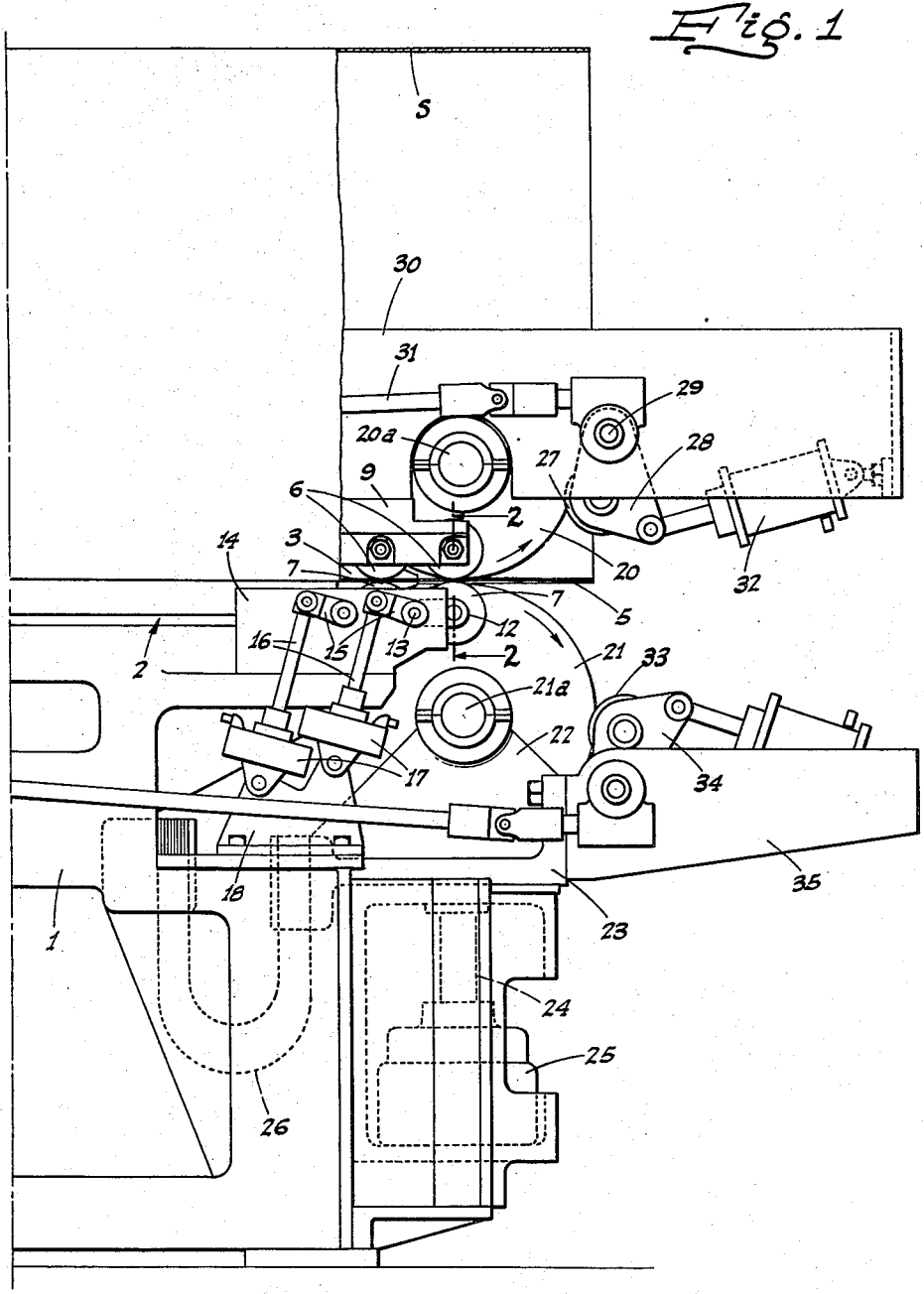
FIG. 1 is a fragmentary side elevation of a shell welding machine, designed for lap welding, and showing particularly those parts which are involved in the present invention.

Referring now more particularly to the drawings, and to the characters of reference marked thereon, the machine in which my features of improvement are incorporated includes a main supporting base and frame structure 1, on which an elongated horizontal Z-bar, indicated generally at 2, is mounted in the conventional manner. This Z-bar, which at its discharge end is in the form of a relatively short and narrow nose 3, is formed throughout its length with opposed grooves 4 in its sides and which face laterally out. As is common practice, such grooves, which are initially some distance apart both vertically and transversely of the Z-bar 2, gradually approach each other in both directions, so that at the outer exit end of the nose 3 of said Z-bar, the grooves overlap and approach very close to each other in a vertical plane, as shown in FIG. 2. These grooves, which are for the purpose of receiving and guiding the initially separated edges of the shell S to be welded as said shell is advanced along the Z-bar, thus cause such edges to emerge from the nose 3 in lapped relation, as shown at 5.

As the shell edges advance along the nose 3, and for a short distance beyond the same, the shell adjacent said edges and on each side of the nose is engaged by upper longitudinally spaced crowder wheels 6 and by lower crowder wheels 7 disposed in vertical alinement with the wheels 6. The spindles 8 of each set of crowder wheels 6 are fixed in a rigid supporting bar 9 suitably mounted in rigid connection with and above the Z-bar 2 laterally out from the wheels and from said Z-bar; the wheels 6 being turnable on said spindles with anti-friction bearings 10 therebetween, as shown in FIG. 2. The spindles 8, while horizontal, are disposed at an angle slightly less than 90 degrees, or about 88 degrees, in a forward or advancing direction, to the longitudinal plane of the Z-bar 2 and the shell S, as indicated in FIG. 3.

The spindles 11 of each set of lower crowder wheels 7, while angled the same as the spindles 8, are mounted on and project laterally inward from the outer or forward ends of substantially horizontal longitudinally extending arms 12. Each arm 12, at its rear end, is fixed on a shaft 13 journaled in a block 14 mounted on the adjacent portion of the frame 1, as shown in FIG. 1.

A rearwardly projecting arm 15 is fixed on shaft 13 laterally out from the block 14, and is connected at its rear end to the depending piston rod 16 of an air pressure cylinder 17 mounted on a bracket 18 secured to frame 1.

By reason of the above described arrangement of parts, the corresponding wheels 6 and 7 may be relatively moved toward each other and into firm gripping engagement with the portion of the shell S disposed therebetween. Since said wheels are disposed at an angle to the longitudinal plane of the shell S, the advance of said shell will cause the crowder wheels to exert a laterally inward pressure on the edge portions of the shell, both when the overlapping ends of said portions are confined in the grooves 4 of the Z-bar nose 3 and when they emerge from the same; the nose 3 terminating rearwardly of the center or shell-gripping point of the foremost crowder wheels. The extent of lap of the shell edges is thus positively maintained, which is a feature of particular importance when the rear end of the shell is being welded.

The shell-engaging edges 19 of the different crowder wheels are disposed at a slight angle to their axes, or so as to correspond to the angle of the engaged portions of the shell S relative to a horizontal plane, so that good contact with the shell is made. Also, such edges are formed with a flat convex curvature, as shown in FIG. 2, so that the crowder wheels will engage shells of different diameters with equal effectiveness.

It will be noted that the sets of crowder wheels on the opposite sides of the Z-bar 2 are of course on different levels, corresponding to the difference in the level of the lapped edge portions of the shell S, as shown in FIG. 2. The different crowder wheels on each side of the Z-bar each having its individual pressure device, the cooperating pairs of wheels may be engaged with the shell with different pressures, with correspondingly different lateral shifting actions on the shell portions engaged by said wheels.

To weld the lapped shell edges 5 together, upper and lower welding or resistance wheels 20 and 21 respectively are provided. The axes of these wheels are in vertical alinement, the axial line being a short distance ahead of the axis of the foremost crowder wheels, as shown. The upper wheel 20 is mounted in a fixed position in a suitable manner in connection with the Z-bar 2. The lower resistance wheel is mounted in brackets 22 upstanding from a vertically movable slide 23, which is engaged by the piston rod 24 of an air power cylinder 25 mounted in a fixed position at the forward end of the frame 1. This arrangement enables the lower resistance wheel to be forced upwardly, so that the shell lap 5 may be firmly pressed between the two resistance wheels with any desired pressure to provide the necessary welding contact. Welding current is supplied to the resistance wheels 20 and 21 in any suitable and conventional manner, and which includes a flexible conductor 26 connected between the frame structure 1 and the slide 23, as indicated in FIG. 1.

The upper resistance wheel is driven in a direction to advance the shell S by means of a friction wheel 27. This wheel is mounted on a bracket 28 which is pivoted some distance above the wheel, as at 29, on and between longitudinal bars 30 which project forwardly from and are rigidly secured to the Z-bar 2 in straddling relation to the upper wheel 20.

A drive shaft 31 extends rearwardly from the bracket 28 alongside one bar 30, and is connected in driving relation with the friction wheel 27 by suitable gearing mounted on the bracket 28, and which it is not believed necessary to show. The friction wheel 27 is yieldably pressed against the resistance wheel 20 by an air pressure cylinder unit 32 connected between the lower end of the bracket 28 and the bars 30 at their forward end.

Similarly, the lower resistance wheel 21 is driven by a driven friction wheel 33 mounted in a bracket 34 which is pivoted between plates 35 secured to the slide 23, so that the friction wheel 33 moves up or down with said slide 23 and the resistance wheel 21, and always maintains the same position relative to the latter.

In order to assure a proper weld of the shell lap 5, considerable pressure must be exerted by the welding wheels against the lapped metal so as to reduce the double thickness of the metal at the lap as much as is practicable, and which double thickness is heated to a high temperature by the action of the welding or resistance wheels. This thickness-reducing or flattening action tends to force the lapped edges of the metal apart laterally, and when the resistance wheels are disposed in straight alinement with the longitudinal plane of the lap 5, as has heretofore been the case, excessive pressure had to be exerted by the foremost set of crowder wheels 6 in order to offset or overcome this lateral spreading tendency of the lapped edges of the shell being welded. If this was not done, the diameter of the finished shell was apt to vary from the intended dimension.

In order to counteract and offset this spreading tendency of the lapped edges of the shell as they are being welded together, and without eliminating the desired flattening or thickness-reducing action on the lap 5, I have arranged the resistance wheels relative to each other as shown in FIG. 3. In this arrangement the axial shaft 20a of the upper resistance wheel 20, while horizontal, is disposed at an angle slightly greater than 90 degrees, in a forward direction, to the longitudinal center line L of the lap 5 on the laterally outer side of such line. Said upper wheel 20, which of course engages the radially inner face of said lap 5, is thus disposed at a correspondingly slight angle A to said line L, while still being in a vertical plane. As a result, the wheel 20 as it is driven, exerts a pressure against the lap portion engaged thereby in a laterally inward direction.

The axial shaft 21a of the lower resistance wheel 21, while also horizontal, is also disposed at a forward angle slightly greater than 90 degrees to said center line L, but on the laterally inner side thereof.

The resistance wheel 21 is thus disposed at a correspondingly slight angle B to said line L, but on the opposite side of said line from angle A. As a result, the wheel 21, while also in a vertical plane, is disposed in crossing relation to the wheel 20, as clearly shown in FIG. 3. Said wheel 21 as it is driven, and engaging as it does the radially outer face of the lap 5, thus also exerts a pressure against the lap portion engaged thereby in a laterally inward direction.

It will be noted that the angles A and B are the same, so that the lateral shifting action of both wheels 20 and 21 is identical; the axes of the shafts 20a and 21a intersecting each other in the vertical plane of the line L, as shown. Each such angle, for the best results, is no greater than 1½ degrees.

The natural tendency of the lapped portions of the shell to separate laterally as they are subjected to the combined pressure and heat of the welding or resistance wheels is thus counteracted, without having to place the adjacent crowder wheels 6 and 7 under excessive pressure to hold the shell parts against separation.

The foremost cooperating crowder wheels 6 and 7, being rearwardly of the point of contact of the resistance wheels with the shell lap 5, do not interfere with the action of the resistance wheels, and maintain the lapped portions of the shell in the proper position relative to each other for the welding operation without any possible conflict between the different shifting pressures exerted by the crowder wheels and resistance wheels, and which pressures are not necessarily the same.

It should here be noted that when there is no shell lap between the resistance wheels, the pressure on the lower wheel is relieved in order to prevent the direct frictional contact of the wheels with each other which would tend to force the same laterally inward and would place an excessive strain on their mounting bearings and supports.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent may be desired:

1. In a machine to weld the longitudinal edges of a cylindrical shell and which machine includes means to advance the shell along the machine to a point of welding; transversely spaced sets of crowder wheels mounted on the machine back from said point and disposed to engage the shell on the inside and outside thereof adjacent and laterally out from said edges; the peripheral faces of all said wheels sloping in the direction of said edges and being convexly curved to engage the curving surfaces of shells of different diameters with equal effectiveness; the radius of such convex curvature of the inside wheels being less than that of any shell.

2. In a machine to lap-weld the lapped edge portions of a shell advancing along the machine and which machine includes means engaging the shell adjacent the lap as the shell advances and then maintaining the edge portions constituting the lap in closely lapped relation from the forward end of the shell rearwardly, cooperating driven resistance wheels disposed to pressingly engage said closely lapped edges from the inside and outside of the shell, means mounting the upper resistance wheel at an angle to the central longitudinal plane of the lap in a direction such that said wheel as it is driven tends to shift the lap edge engaged thereby in a laterally inward direction, and means mounting the other resistance wheel at a corresponding angle to said longitudinal plane of the lap in a direction that such other wheel as driven tends to shift the lap edge engaged thereby in a laterally inward direction; each such angle being no greater than 1½ degrees.

3. In a machine to lap-weld the lapped edge portions of a shell advancing along the machine and which machine includes means engaging the shell adjacent the lap as the shell advances and then maintaining the edge portions constituting the lap in closely lapped relation from the forward end of the shell rearwardly, cooperating driven resistance wheels disposed to pressingly engage said closely lapped edges from the inside and outside of the shell, means mounting the upper resistance wheel at an angle to the central longitudinal plane of the lap in a direction such that said wheel as it is driven tends to shift the lap edge engaged thereby in a laterally inward direction, and means mounting the other resistance wheel at a corresponding angle to said longitudinal plane of the lap in a direction that such other wheel as driven tends to shift the lap edge engaged thereby in a laterally inward direction; the first named means comprising crowder wheels disposed on opposite sides of the lap above and below the same, said crowder wheels on one side being set at an angle substantially the same as that of the upper resistance wheel and the crowder wheels on the other side are set at an angle substantially the same as that of the other resistance wheel.

4. In a machine to lap-weld the lapped edge portions of a shell advancing along the machine and which machine includes means engaging the shell adjacent the lap as the shell advances and then maintaining the edge portions constituting the lap in closely lapped relation from the forward end of the shell rearwardly, cooperating driven resistance wheels disposed to pressingly engage said closely lapped edges from the inside and outside of the shell, crowder wheels to engage the shell adjacent the lap above and below the same and on opposite sides thereof and arranged as front and rear pairs, and means to exert an upward pressure separately on the lower crowder wheels of the pairs.

References Cited in the file of this patent

UNITED STATES PATENTS

| 1,035,964 | Heinsohn et al. | Aug. 20, 1912 |
| 2,013,517 | Kachel | Sept. 3, 1935 |
| 2,454,948 | Seltzer | Nov. 30, 1948 |

FOREIGN PATENTS

| 263,783 | Great Britain | Mar. 3, 1927 |